(12) United States Patent
Wigg et al.

(10) Patent No.: US 10,029,533 B1
(45) Date of Patent: Jul. 24, 2018

(54) VEHICLE SUSPENSION CONTROL SYSTEM

(71) Applicant: CATERPILLAR UNDERGROUND MINING PTY LTD., South Burnie, Tasmania (AU)

(72) Inventors: Jason Prakash Wigg, Tasmania (AU); Andrew Ellis Diecker, Tasmania (AU)

(73) Assignee: Caterpillar Underground Mining Pty Ltd, Burnie (AU)

( * ) Notice: Subject to any disclaimer, the term of this patent is extended or adjusted under 35 U.S.C. 154(b) by 0 days.

(21) Appl. No.: 15/413,183

(22) Filed: Jan. 23, 2017

(51) Int. Cl.
*B60G 17/015* (2006.01)
*B60G 13/14* (2006.01)
(Continued)

(52) U.S. Cl.
CPC .......... *B60G 17/0152* (2013.01); *B60G 11/26* (2013.01); *B60G 13/06* (2013.01); *B60G 13/14* (2013.01); *B60G 15/12* (2013.01); *B60G 17/0432* (2013.01); *B60G 17/056* (2013.01); *B60G 2202/42* (2013.01); *B60G 2204/8304* (2013.01); *B60G 2300/02* (2013.01);
(Continued)

(58) Field of Classification Search
CPC .... B60G 17/0152; B60G 11/26; B60G 13/06; B60G 13/14; B60G 15/12; B60G 2202/42; B60G 2204/8304; B60G 2300/02
See application file for complete search history.

(56) References Cited

U.S. PATENT DOCUMENTS 3,922,000 A * 11/1975 Pruvot ................. B60G 17/019
188/269
4,743,000 A * 5/1988 Karnopp ............ B60G 17/0152
188/266.5

(Continued)

FOREIGN PATENT DOCUMENTS

| DE | 35 28 883 | 2/1986 |
| DE | 101 21 617 | 6/2002 |
| TW | 201041760 | 12/2010 |

OTHER PUBLICATIONS

EPO Translated Text of DE 35 28 883.
EPO Translated Text of DE 101 21 617.
Questel Orbit Translated Text of TW 201041760.

*Primary Examiner* — Mussa A Shaawat
(74) *Attorney, Agent, or Firm* — Finnegan, Henderson, Farabow, Garrett & Dunner, LLP

(57) ABSTRACT

A vehicle suspension control system is disclosed for use in load-carrying vehicles. The system controls a response of a suspension cylinder configured to support a main body of a vehicle in relation to a ground-contacting portion of the vehicle. A main accumulator is configured to contain a main compressible gas volume and is fluidly connected with the suspension cylinder. An auxiliary accumulator is configured to contain an auxiliary compressible gas volume. A valve is configured to selectively fluidly connect the auxiliary accumulator to the suspension cylinder. When the valve is open, compressing the suspension cylinder compresses both the main compressible gas volume and the auxiliary compressible gas volume. When the valve is closed, the auxiliary accumulator is fluidly isolated from the suspension cylinder. A processor is configured to automatically open or close the valve using a solenoid actuator based on one or more operating parameters of the vehicle.

20 Claims, 4 Drawing Sheets

(51) Int. Cl.
*B60G 11/26* (2006.01)
*B60G 13/06* (2006.01)
*B60G 17/04* (2006.01)
*B60G 17/056* (2006.01)
*B60G 15/12* (2006.01)

(52) U.S. Cl.
CPC .... *B60G 2400/204* (2013.01); *B60G 2400/51* (2013.01); *B60G 2400/90* (2013.01); *B60G 2500/114* (2013.01); *B60G 2500/2041* (2013.01); *B60G 2500/2062* (2013.01); *B60G 2600/18* (2013.01); *B60G 2800/01* (2013.01)

(56) References Cited

U.S. PATENT DOCUMENTS

| | | | |
|---|---|---|---|
| 4,765,649 A | 8/1988 | Ikemoto et al. | |
| 5,941,508 A * | 8/1999 | Murata | B60G 17/044 267/64.17 |
| 6,321,887 B1 * | 11/2001 | Kurusu | B60G 17/018 188/266.2 |
| 6,786,492 B2 | 9/2004 | Brandenburger | |
| 6,959,932 B2 | 11/2005 | Svartz et al. | |
| 7,641,208 B1 * | 1/2010 | Barron | B60G 21/0556 280/124.106 |
| 8,075,002 B1 | 12/2011 | Pionke et al. | |
| 9,855,883 B2 * | 1/2018 | Martindale | B60P 7/13 |
| 2002/0171209 A1 * | 11/2002 | Brandenburger | B60G 17/0408 280/5.519 |
| 2003/0125859 A1 * | 7/2003 | Dix | B60G 3/14 701/50 |
| 2004/0245732 A1 * | 12/2004 | Kotulla | B60G 11/44 280/5.502 |
| 2009/0194179 A1 * | 8/2009 | Morris | B60G 17/0525 137/625.11 |
| 2011/0035104 A1 * | 2/2011 | Smith | B60G 17/017 701/37 |
| 2011/0094855 A1 * | 4/2011 | Terazawa | B62D 65/04 198/464.1 |
| 2012/0055745 A1 * | 3/2012 | Buettner | B60G 17/0161 188/266.2 |
| 2012/0067432 A1 * | 3/2012 | Vigholm | E02F 9/2217 137/14 |
| 2014/0288776 A1 * | 9/2014 | Anderson | B60G 17/016 701/37 |
| 2015/0224845 A1 * | 8/2015 | Anderson | B60G 17/019 701/37 |
| 2017/0182859 A1 * | 6/2017 | Anderson | B60G 17/052 |

* cited by examiner

VEHICLE SUSPENSION CONTROL SYSTEM

TECHNICAL FIELD

The present disclosure relates generally to a suspension system and, more particularly, to a vehicle suspension control system for automatically switching between a first mode and a second mode.

BACKGROUND

Load-carrying vehicles, such as underground mining trucks, include suspension systems which absorb bumps and other terrain inconsistencies. Such vehicles are often heavily loaded with materials, such as ore or rock, greatly increasing their effective weight. For example, some load-carrying vehicles carry their own weight or more in materials. This results in the vehicle having drastically different effective vehicle weights in a loaded state than an unloaded state. Load-carrying vehicles are frequently driven in each of these states, which makes tuning the vehicle's suspension system difficult.

Some suspension systems of load-carrying vehicles are tuned according to the loaded state to prevent bottoming out, which could damage the vehicle. Bottoming out occurs when the suspension reaches its fully compressed state, resulting in damaging impact to various components of the system, such as the shock absorbers or struts. This approach, however, results in an overly stiff response when the vehicle is driven in the unloaded state. As a result, terrain variations and inconsistencies create a rough and jarring ride for the vehicle operator in the unloaded state, reducing the operator's comfort and productivity.

To address these issues, some vehicle suspension systems adjust stiffness and ride height between the loaded and unloaded states. One such system is described in U.S. Pat. No. 6,959,932 which issued to Svartz et al. on Nov. 1, 2005 ("the '932 patent"). The suspension system of the '932 patent measures both the pressure in an air spring and the load on a rear axle. In response to these measurements, the system adjusts the pressure in the air spring to change both the vehicle's ride height and the spring's stiffness. To adjust for the loaded state, air is pumped into the system at a pressure greater than the system's operating pressure, increasing both the ride height and stiffness. Then to adjust for the unloaded state, a valve releases air from the air spring to reduce its stiffness and the vehicle's ride height.

Another vehicle suspension system is described in U.S. Pat. No. 8,075,002 which issued to Pionke et al. on Dec. 13, 2001 ("the '002 patent"). The suspension system uses a dedicated hydraulic pump to force fluid from a reservoir into the suspension system and increase its operating pressure, thereby increasing its stiffness. The hydraulic pump must be capable of overcoming the system's working pressure, which can be substantial, to force hydraulic fluid into the system. For example, the hydraulic pump should preferably be capable of producing 9,000 pounds per square inch (psi) or more.

Although the systems of the '932 patent and '002 patent may help to improve the vehicle suspension system's characteristics, they are energy inefficient and result in undesirable delays when switching between operating modes. The air supply of the '932 patent and the hydraulic pump of '002 patent consume power each time they increase the system's stiffness to switch from the unloaded mode to the loaded mode. Additionally, switching from the unloaded to loaded mode requires waiting for the hydraulic pump to increase the system pressure to the desired pressure, adding undesirable delay. Lastly, the system of the '002 pump also requires an oil reservoir, an additional component adding complexity and cost to the system.

The disclosed suspension system is directed to overcoming one or more of the problems set forth above and/or other problems of the prior art.

SUMMARY

In one aspect, the present disclosure is directed to a suspension control system for controlling a response of a suspension cylinder. The suspension cylinder is configured to support a main body of a vehicle in relation to a ground-contacting portion of the vehicle. The suspension control system includes a main accumulator configured to contain a main compressible gas volume. The main accumulator may be a tank or vessel, for example. The main accumulator is fluidly connected with the suspension cylinder such that compressing the suspension cylinder compresses the main compressible gas volume. An auxiliary accumulator is configured to contain an auxiliary compressible gas volume. A valve is configured to selectively fluidly connect the auxiliary accumulator to the suspension cylinder. When the valve is in an open position, compressing the suspension cylinder compresses both the main compressible gas volume and the auxiliary compressible gas volume. When the valve is in a closed position, the auxiliary accumulator is fluidly isolated from the suspension cylinder. A solenoid actuator is configured to open and close the valve. A processor is configured to monitor one or more operating parameters of the vehicle and automatically open or close the valve using the solenoid actuator based on one or more operating parameters of the vehicle.

In another aspect, the present disclosure is directed to a method for controlling a response of a suspension cylinder of a vehicle. The method includes monitoring one or more operating parameters of the vehicle and automatically switching between a first mode and a second mode based on one or more operating parameters of the vehicle. The first mode includes a first spring stiffness and a first damping rate. The second mode includes at least one of a second spring stiffness lower than the first spring stiffness and a second damping rate lower than the first damping rate.

In another aspect, the present disclosure is directed to a control system for a suspension cylinder. The control system includes a main accumulator tank configured to contain a main compressible gas volume. The main accumulator tank is fluidly connected with the suspension cylinder such that compressing the suspension cylinder compresses the main compressible gas volume. An auxiliary accumulator tank is configured to contain an auxiliary compressible gas volume. A valve is configured to selectively fluidly connect the auxiliary accumulator tank to the suspension cylinder. When the valve is in the open position, compressing the suspension cylinder compresses both the main compressible gas volume and the auxiliary compressible gas volume. When the valve is in the closed position, the valve fluidly disconnects the auxiliary compressible gas volume from the suspension cylinder. A solenoid is configured to open and close the valve. A processor is configured to monitor one or more operating parameters of the vehicle and automatically open or close the valve using the solenoid based on the one or more operating parameters of the vehicle.

DETAILED DESCRIPTION

Figure 1:
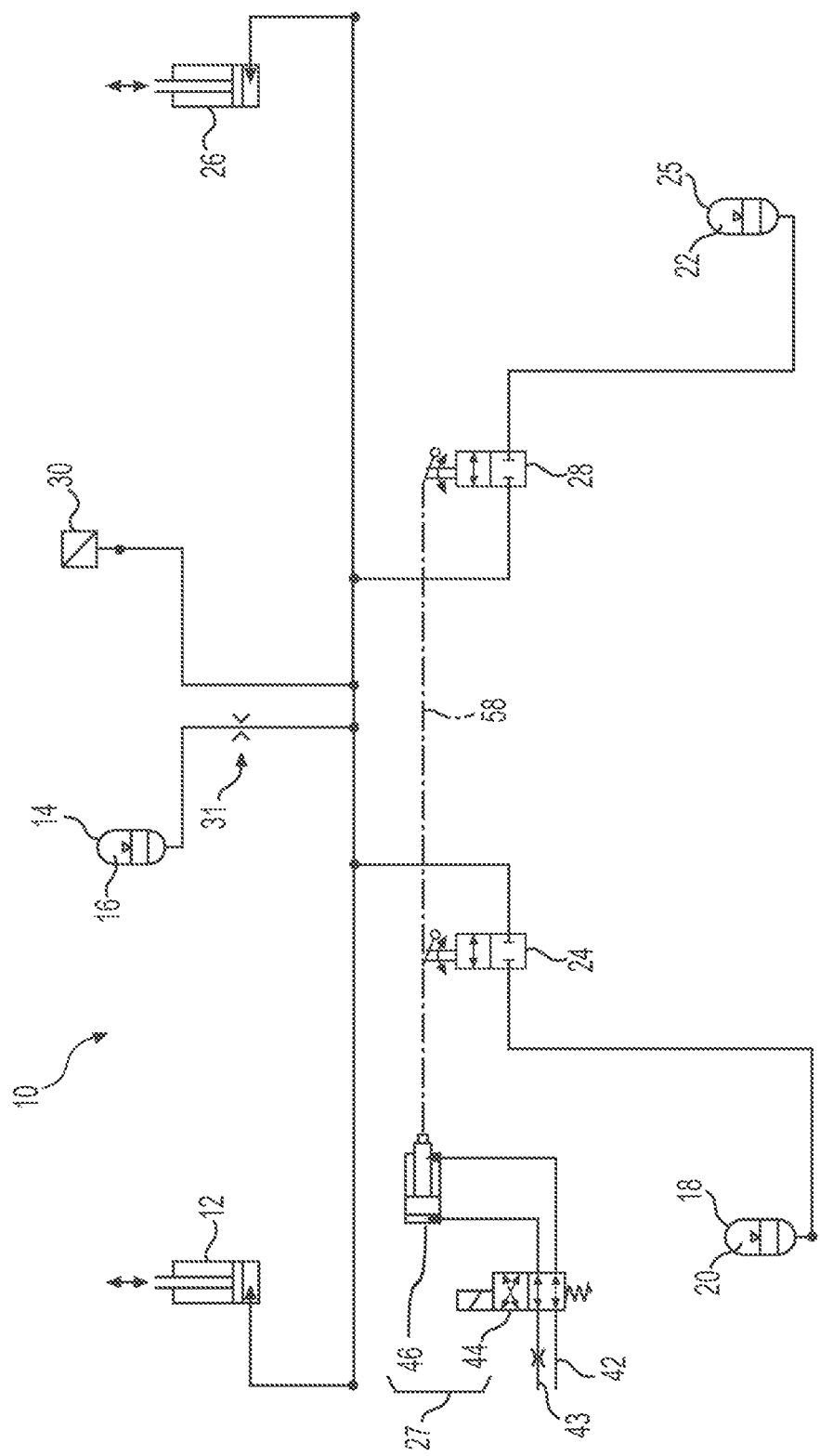
FIG. 1 is a schematic illustration of one embodiment of the vehicle suspension control system.

FIG. 1 illustrates a schematic view of one embodiment of the vehicle suspension control system 10. The control system 10 includes at least a first suspension cylinder 12 configured to support a main body of a vehicle in relation to a ground-contacting portion of the vehicle. A main accumulator 14 contains a main compressible gas volume 16 and is fluidly connected with the first suspension cylinder 12 with hoses containing an incompressible hydraulic fluid. The movement of the first suspension cylinder 12 is coupled with the main accumulator 14 such that compressing the first suspension cylinder 12 compresses the main compressible gas volume 16 within the main accumulator 14. Similarly, extending the first suspension cylinder 12 expands the main compressible gas volume 16 within the main accumulator 14.

The control system 10 also includes a first auxiliary accumulator 18 containing a first auxiliary compressible gas volume 20. A first valve 24 is configured to selectively fluidly connect the first auxiliary accumulator 18 to the first suspension cylinder 12. When the first valve 24 is in an open position, the first valve 24 fluidly connects the first auxiliary accumulator 18 to the first suspension cylinder 12. In this state, compressing the first suspension cylinder 12 compresses both the main compressible gas volume 16 and the first auxiliary compressible gas volume 20. Similarly, extending the first suspension cylinder 12 expands both the main compressible gas volume 16 and the first auxiliary compressible gas volume 20.

In contrast, when the first valve 24 is in a closed position the first valve 24 fluidly isolates the first auxiliary accumulator 18 from the first suspension cylinder 12. In this state, the first auxiliary accumulator 18 is not fluidly connected with the first suspension cylinder 12. As a result, the movement of the first suspension cylinder 12 does not result in a change in the pressure of the first auxiliary compressible gas volume 20. Compressing or extending the first suspension cylinder 12 does not affect the first auxiliary compressible gas volume 20 contained within the first auxiliary accumulator 18. Thus, when the first valve 24 is closed, a total compressible gas volume that is fluidly connected with the first suspension cylinder 12 is less than when the first valve 24 is open.

The embodiment of the control system 10 illustrated in FIG. 1 includes a second suspension cylinder 26 and a second auxiliary accumulator 25 containing a second auxiliary compressible gas volume 22. A control system having only a single auxiliary accumulator and a single suspension cylinder, however, would function in effectively the same manner. The first suspension cylinder 12 and the second suspension cylinder 26 are fluidly connected each other and with the main accumulator 14. Thus, although this embodiment includes two suspension cylinders 12, 26, the first suspension cylinder 12 and the second suspension cylinder 26 effectively function together as a single suspension cylinder in this embodiment. Similarly, while this embodiment includes two separate accumulators, the first auxiliary accumulator 18 and the second auxiliary accumulator 25 effectively function as a single auxiliary accumulator.

This embodiment includes the second auxiliary accumulator 25 and the second suspension cylinder 26 for practical reasons associated with damping and the diameters of the various hoses. The various hoses connecting the components of the control system 10 have respective lengths and diameters. These lengths and diameters affect the fluid damping provided by friction within the hoses. To provide the desired damping response, the hoses are generally sized to provide the desired amount of damping. Providing two suspension cylinders 12, 26 and two auxiliary accumulators 20, 22 allows the control system 10 to provide the desired damping response using hoses that have smaller diameters than an equivalent system with only one suspension cylinder and one auxiliary accumulator.

Alternatively, however, other configurations are possible. For example, the first suspension cylinder 12 may be coupled with the left side (or a specific wheel) of the vehicle and the second suspension cylinder 26 with the right side (or a different wheel). In such a configuration, the fluid line between the suspension cylinders 12, 26 may provide damping with a restrictor (not shown) to partially de-couple the movement of the first suspension cylinder 12 from the second suspension cylinder 26. Various other configurations are possible based on the disclosure herein. For example, a second main accumulator (not shown) may be provided and connected with the second suspension cylinder 26. Additionally, multiple control systems may be used for a single vehicle. For example, a first control system may be provided for the first suspension cylinder 12, which may be coupled with the left side of the vehicle, and a second control system may be provided for the second suspension cylinder 26, which may be coupled with the right side of the vehicle. One of ordinary skill in the art would understand that yet other configurations are possible based on the disclosure herein.

Returning to the embodiment illustrated in FIG. 1, a solenoid actuator 27 is configured to simultaneously open both the first valve 24 associated with the first auxiliary accumulator 18 and a second valve 28 associated with the second auxiliary accumulator 25. Thus, the solenoid actuator 27 is configured to switch between a first mode and a second mode. In the first mode, the valves 24, 28 fluidly connect each of the first auxiliary accumulator 18 and the second auxiliary accumulator 25 to the suspension cylinders 12, 26. In the second mode, the valves 24, 28 fluidly isolate the auxiliary accumulators 18, 25 from the suspension cylinders 12, 26.

The control system 10 is configured to automatically open and close the valve based on one or more operating parameters of the vehicle. A processor, such as the electronic control module of the vehicle ("ECM"), is configured to supply a control signal to the solenoid actuator 27 to cause the solenoid actuator 27 to open and close the valves 24, 28 based on one or more operating parameters of the vehicle. The processor is also configured to monitor one or more of the operating parameters of the vehicle. In the embodiment shown in FIG. 1, the processor is connected with a pressure sensor 30 which is configured to measure a pressure in the suspension cylinders 12, 26. Additionally, the processor may be connected with other sensors such as one or more of the following: a speed sensor measuring the speed of the vehicle; a transmission sensor measuring the state of a transmission of the vehicle (forward, reverse, etc.); a park brake sensor measuring the state of a park brake of the vehicle; and an engine sensor or a tachometer indicating whether an engine of the vehicle is running. These sensors are not illustrated in FIG. 1 and are generally pre-existing on the vehicle prior to installation of the control system 10.

The ability to selectively connect and disconnect the auxiliary accumulators 18, 25 provides the control system 10 with a first mode and a second mode. The first mode includes a first spring stiffness and a first damping rate associated with a response of the suspension cylinders 12, 26. The second mode includes at least one of a second spring stiffness which is lower than the first spring stiffness and a second damping rate which is lower than the first damping rate. The suspension cylinders 12, 26 provide two force components: a static spring force and a dynamic damping force. The spring stiffness characterizes the relationship between the static spring force exerted by the suspension cylinders 12, 26 and the displacement (amount of compression) of the suspension cylinders 12, 26. The damping rate, in contrast, characterizes the dynamic damping force exerted by the suspension cylinders 12, 26 caused by movement (compression/extension) of the suspension cylinders 12, 26. The damping rate relates the dynamic damping force with the rate of compression/extension of the suspension cylinders 12, 26. The static spring force and the dynamic damping force of the suspension cylinders 12, 26 work together to provide suspension for the main body portion of the vehicle. The static spring force supports the weight of the main body portion of the vehicle, and the dynamic damping force reduces oscillations of the main body portion of the vehicle.

As explained above, in the first mode the valve is closed, and the auxiliary accumulators 18, 25 are fluidly disconnected from the suspension cylinders 12, 26. In the second mode, the valve is open, and the auxiliary accumulators 18, 25 are fluidly connected with the suspension cylinders 12, 26. Because the compressible gas volumes 16, 20, 22 act like air springs, the effective spring stiffness of the first and second modes are inversely related to the total volume of compressible gas associated with the suspension cylinders 12, 26 in each respective mode. In the first mode, the total volume of compressible gas fluidly connected with the suspension cylinders 12, 26 is only the main compressible gas volume 16 contained in the main accumulator 14. In the second mode, however, the total volume of compressible gas fluidly connected with the suspension cylinders 12, 26 also includes the auxiliary compressible gas volumes 20, 22 in addition to the main compressible gas volume 16. Opening the valve, therefore, increases the total compressible gas volume fluidly connected with the suspension cylinders 12, 26. Because spring stiffness is inversely related to the compressible gas volume associated with the air spring, this results in the second spring stiffness of the second mode being lower than the first spring stiffness of the first mode.

The first damping rate of the first mode is related to the friction along the fluid path between the suspension cylinders 12, 26 and the main accumulator 14. To provide additional damping, a restrictor 31 may be provided in the fluid path between the suspension cylinders 12, 26 and the main accumulator 14. Similarly, the second damping rate of the second mode is related to both the friction along the fluid path associated with the first mode and, additionally, the friction along the fluid path between the auxiliary accumulators 18, 25 and the suspension cylinders 12, 26. In the embodiment illustrated in FIG. 1, the second fluid path between the auxiliary accumulators 18, 25 and the suspension cylinders 12, 26 does not include a restrictor. As a result, the second damping rate of the second mode is lower than the first damping rate of the first mode. Thus, the second mode includes at least one of a second spring stiffness which is lower than the first spring stiffness and a second damping rate which is lower than the first damping rate.

Figure 2:
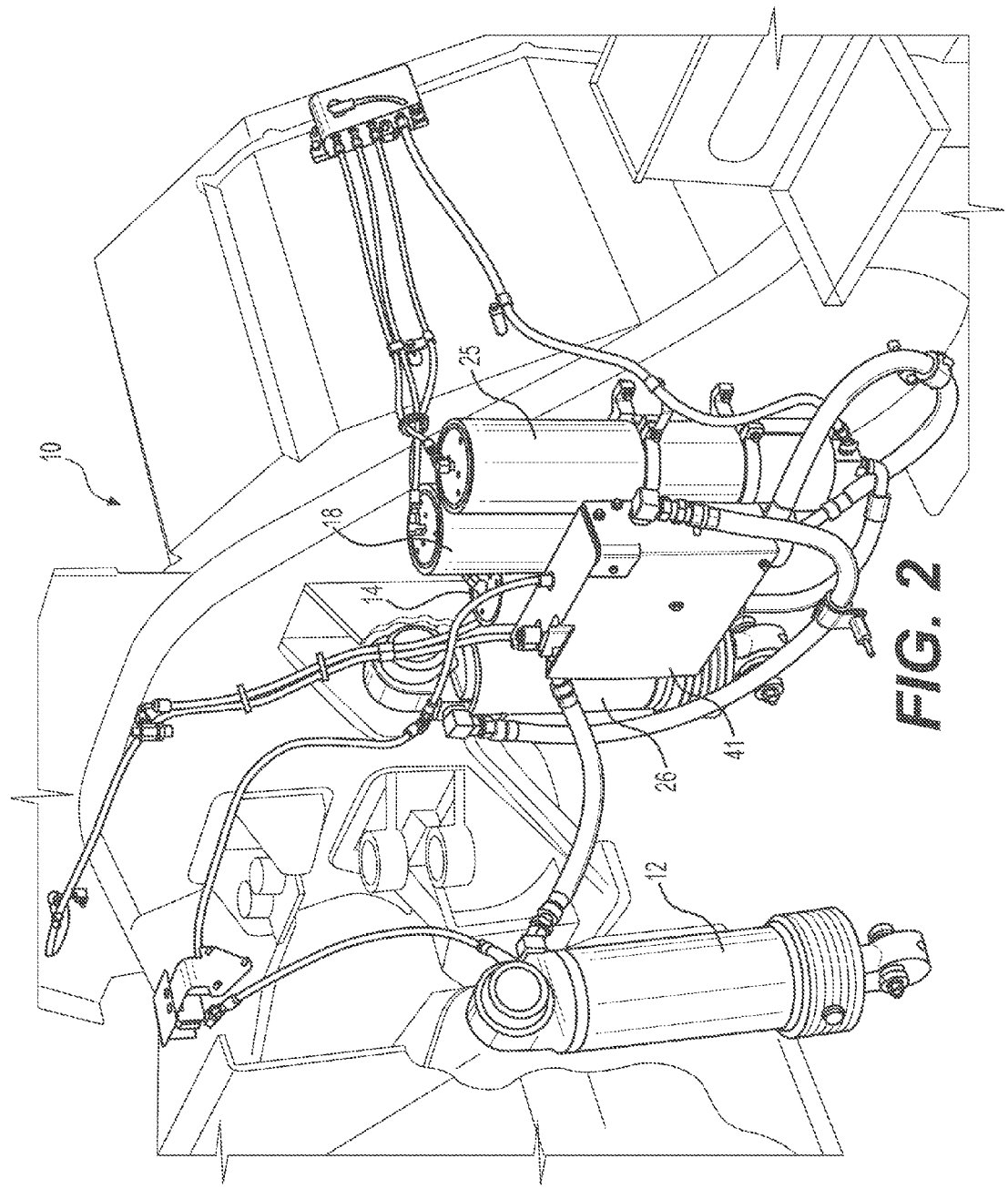
FIG. 2 is a perspective illustration of one embodiment of the vehicle suspension control system.

FIG. 2 illustrates one embodiment of the vehicle suspension control system 10 schematically illustrated in FIG. 1. The suspension cylinders 12, 26 are configured to support the main body of the vehicle on the ground-contacting portion of the vehicle. For clarity, the ground-contacting portion of the vehicle is not shown in FIG. 2. The control system 10 includes the main accumulator 14, the first auxiliary accumulator 18, and the second auxiliary accumulator 25. The control system 10 also includes a control box 41 containing several components.

Figure 3:
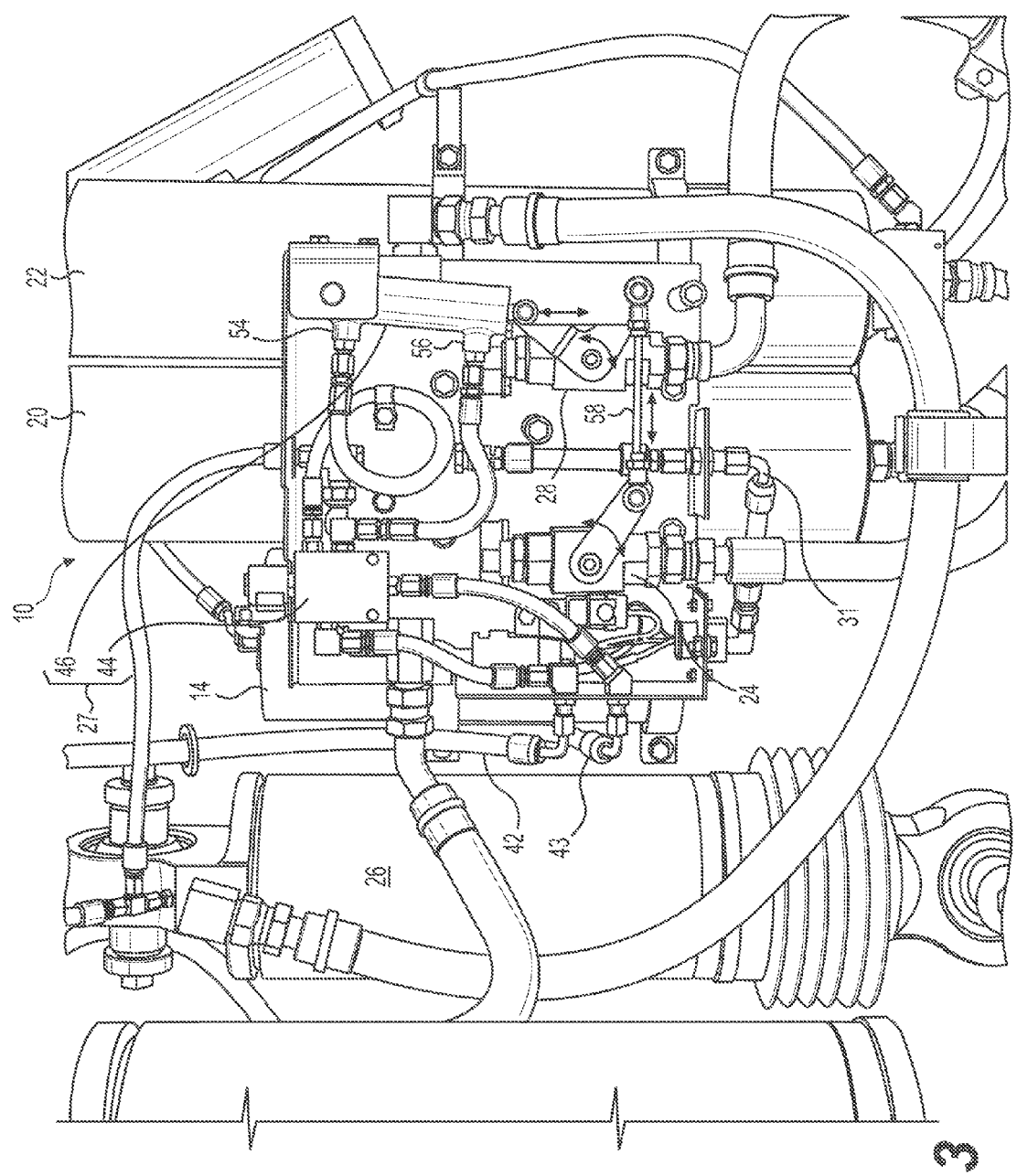
FIG. 3 is a perspective illustration of the inside of the control box of the embodiment illustrated in FIG. 2.

FIG. 3 illustrates the inside of the control box 41 shown in FIG. 2. The hydraulic line between the main accumulator 14 and the suspension cylinders 12, 26 includes the restrictor 31. The junction between the main accumulator 14 and the suspension cylinders 12, 26 is not shown in FIG. 3 because it is located behind the control box 41 in the embodiment illustrated in FIGS. 2 and 3.

The solenoid actuator 27 is configured to simultaneously open each of the first valve 24 and the second valve 28. The solenoid actuator 27 may have two components: an electric solenoid 44 and a hydraulic cylinder 46. The electric solenoid 44 is configured to use an existing pilot oil supply 42 of the engine of the vehicle as a source of power to open or close the valves 24, 28. The electric solenoid 44 is fluidly connected with the pilot oil supply 42 and a pilot oil return 42. The electric solenoid 44 is also fluidly connected with a first chamber 54 and a second chamber 56 of hydraulic cylinder 46. The electric solenoid 44 is configured to selectively connect the existing pilot oil supply 42 to either the first chamber 54 or the second chamber 56 of the hydraulic cylinder 46. Connecting the existing pilot oil supply 42 to the first chamber 54 causes oil to flow into the first chamber 54 and force a mechanical linkage 58 to move in a first direction. The mechanical linkage 58 connects the hydraulic cylinder 46 to each of the first valve 24 and the second valve 28. Forcing the mechanical linkage 58 in the first direction opens the valves 24, 28. Similarly, connecting the existing pilot oil supply 42 to the second chamber 56 causes oil to flow into the second chamber 56 and forces the mechanical linkage 58 in a second direction, closing the valves 24, 28.

Alternatively, in another embodiment, instead of using both the electric solenoid 44 and the hydraulic cylinder 46 to open and close the valves 24, 28, the electric solenoid 44 may be directly coupled with the valves 24, 28. In this alternative embodiment, the solenoid may directly open and close the valves 24, 28 without the hydraulic cylinder 46 or the pilot oil supply 42. As is known in the art, an electric solenoid generally generates an electromagnetic field to act as an actuator. For example, a plurality of electric coils may surround a magnet, such that generating a current through the coils in turn generates an electric field which forces an arm of the solenoid actuator 27 to move. In this alternative embodiment, the arm of the electric solenoid 44 is directly connected with the valves 24, 28 such that actuating the arm of the electric solenoid 44 directly opens and closes the valves 24, 28.

The valves 24, 28 may be any suitable type of valve known in the art. In the embodiment illustrated in FIGS. 2-3, ball valves are used. Ball valves provide several advantages, including accommodating high flow rates with minimal damping. Additionally, ball valves may allow significantly less leakage when closed than other types of valves.

An override switch may be electrically connected with the processor. The override switch may be used to indicate the operator's intent to manually override the operation of the control system 10. The override switch may have various positions corresponding to various alternative operating modes of the processor. For example, the override switch may cause the processor to default into the first mode or the second mode. The override switch may also have a "service mode" position.

Variations of the embodiments disclosed above are intended to be within the scope of this disclosure. For example, in the embodiments shown in FIG. 1-3, the suspension cylinders 12, 26 are filled entirely with hydraulic fluid. Similarly, the various hoses connecting the various components are similarly filled entirely with hydraulic fluid. In those embodiments, the only compressible gas associated with the control system 10 is contained with the main accumulator 14 and hydraulic accumulators 14, 18, 25. Alternatively, in another embodiment, the control system 10 may contain compressible gas in other locations, such as in the suspension cylinders 12, 26 or one or more of the hoses. In another embodiment, the entire system 10 may be pneumatic, containing compressible gas instead of incompressible hydraulic fluid. In this embodiment, a separate damping mechanism may be provided for the suspension cylinders 12, 26. Alternatively, in another embodiment, the system may be configured with electro-hydraulic actuators.

In other embodiments, the control system 10 may use various features to further adjust the response of the suspension cylinders 12, 26. For example, in one embodiment, the processor may be configured to engage or adjust various restrictors (not shown) that are configured to provide additional damping along the various fluid paths in the control system 10. For example, the fluid path between the second valve 28 and the second auxiliary accumulator 25 may contain a restrictor (not shown) that can be selectively activated such that the processor can adjust the damping response in the second mode based on one or more of the operating parameters.

In other embodiments, the control system 10 may have additional modes beyond the first and second mode described above. For example, the control system 10 may have a third mode in which a third auxiliary accumulator is selectively fluidly connected with the one or more suspension cylinders 12, 26. In this embodiment, the first, second, and third mode may be tuned, respectively, for heavily loaded, lightly loaded, and unloaded modes, for example. Alternatively, in another embodiment, the valves 24, 28, are mechanically de-coupled, and a second actuator (not shown) is configured to open and close the second valve 28. In this embodiment, the control system may enter a lightly loaded mode by opening only one of the first valve 24 or the second valve 28, instead of both. One of ordinary skill in the art would understand that additional variations including additional modes are possible based on the disclosure herein.

INDUSTRIAL APPLICABILITY

The disclosed vehicle suspension control system 10 finds potential application with any vehicle that is driven while carrying a load that affects the performance characteristics of its suspension system. The disclosed vehicle suspension control system 10 finds particular applicability with underground mining trucks as they are often loaded and unloaded such that their total effective weight increases substantially (potentially doubling or more) between the unloaded state and loaded state. A method of controlling the response of the suspension cylinders 12, 26 will now be explained. While the method will be explained with reference to both suspension cylinders 12, 26, the method finds applicability in systems having a single suspension cylinder and a single auxiliary accumulator as well.

The processor, such as the electronic control module of the vehicle, monitors one or more operating parameters of the vehicle and automatically switches between the first mode and the second mode based on one or more operating parameters of the vehicle. For example, the operating parameters of the vehicle may include the following: the pressure in the suspension cylinders 12, the speed of the vehicle, the state of the transmission of the vehicle, the state of the park brake, engine tachometer speed, and whether the engine of the vehicle is running. The processor is configured to use the solenoid actuator 27 to open or close the valves 24, 28 to switch between the first mode and the second mode. Opening the valves 24, 28 fluidly connects the auxiliary compressible gas volumes 20, 22 to the main compressible gas volume 16 and thereby increases the total compressible gas volume fluidly connected with the suspension cylinders 12, 26.

The processor automatically selects the most appropriate mode for the vehicle based on one or more operating parameters. For example, when the vehicle is loaded, the pressure in the suspension cylinders 12, 26 may generally be above a threshold pressure. Thus, when the vehicle is loaded, the processor may select the first mode. The first mode may have a firmer response than the second mode and therefore be more appropriate for the loaded weight of the vehicle. When the vehicle is unloaded, the processor may select the second mode, which may have a more compliant response than the first mode. The second mode, therefore, may generally be more appropriate for the unloaded weight of the vehicle. The above explanation, however, only generally describes the operation of the vehicle suspension control system 10 in one embodiment. Detailed operation of the vehicle suspension control system 10 will now be explained.

Figure 4:
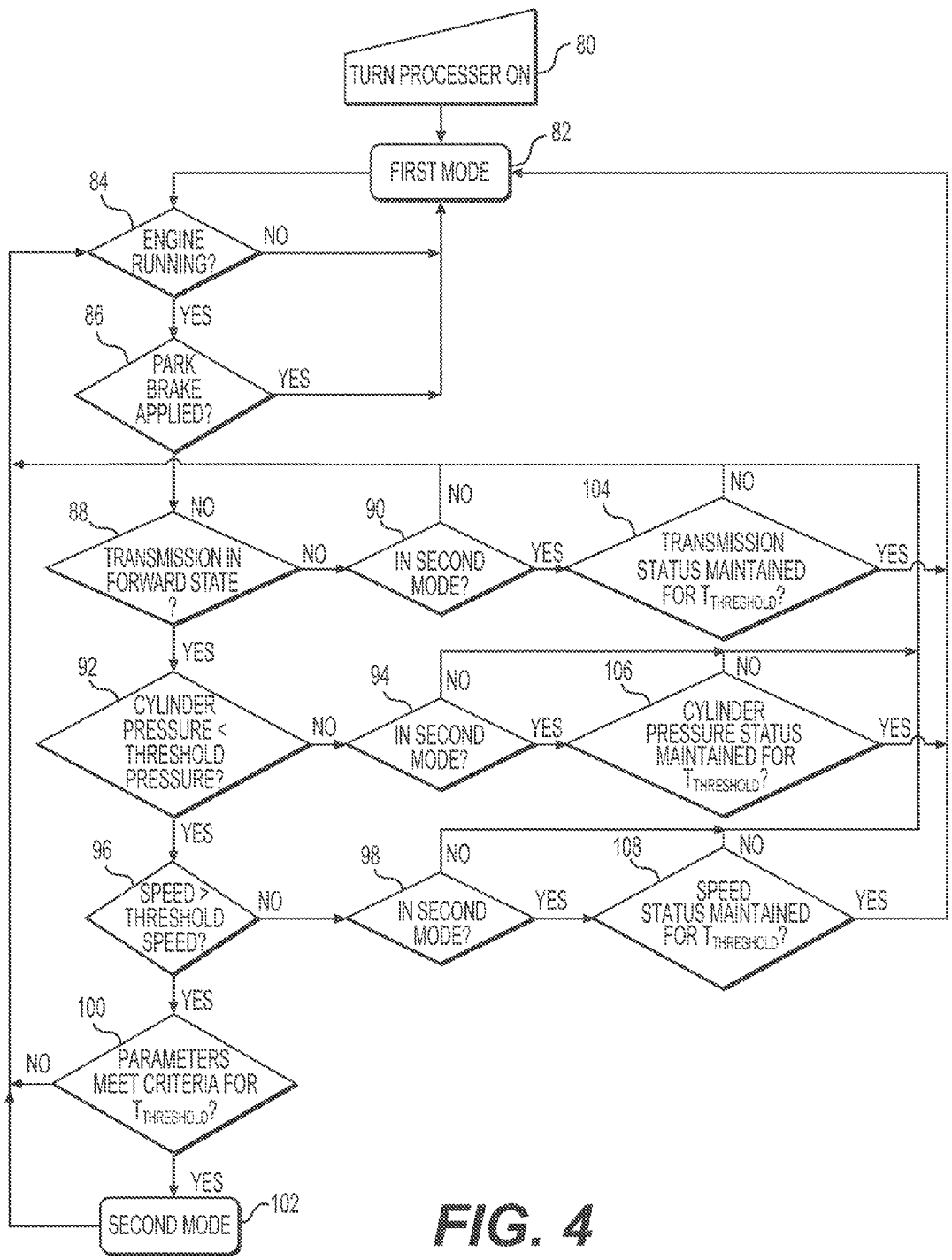
FIG. 4 is a flowchart illustration of one embodiment of the method for controlling a response of a suspension cylinder of a vehicle.

FIG. 4 is a flowchart illustrating one embodiment of the method of operating the vehicle suspension control system 10. Although illustrated in FIG. 4 as a series of consecutive steps, one of skill in the art would understand that the processor does not necessarily literally conduct each step in order or conduct only one step at any given time. Rather, the processor regularly receives input from the sensors for each of the parameters and implements the rules and logic illustrated in FIG. 4. For example, the processor may monitor each of the sensors at 10 Hz.

The flowchart illustrated in FIG. 4 shows a conceptual illustration one embodiment of method of controlling the response of the suspension cylinders 12, 26. At step 80, the method includes initiating the processor, such as the ECM. The processor initializes the control system 10 in the first mode in step 82. In step 84, processor detects whether the engine of the vehicle is running. If the engine is not running, the processor returns to step 82. If the engine is running, the method proceeds to step 86. In step 86, the processor detects if the park brake is applied. If the park brake is applied, the method returns to step 82, and the control system 10 remains in the first mode. If the park brake is not applied, the method proceeds to step 88. Thus, in normal operation, the control system 10 remains in the first mode if either the engine is not running or if the park brake is applied.

The processor switches the control system 10 from the first mode to the second mode based on one or more operating parameters. In step 88, the processor detects whether the transmission is in a forward state. If the transmission is in the forward state, the method proceeds to step 92. If the transmission is not in the forward state, the method proceeds to step 90. In step 90, the processor determines if the control system 10 is currently in the second mode. At this point in the description, the control system 10 is in the first mode, so the method returns to step 84.

Returning to step 92, the processor determines if the pressure in the suspension cylinders 12, 26 is less than the threshold pressure. If the pressure in the suspension cylinders 12, 26 is less than the threshold pressure, the method proceeds to step 96. If the pressure in the suspension cylinders 12, 26 is not less than the threshold pressure, the method proceeds to step 94. In step 94, similar to step 90, the processor determines if the control system 10 is currently in the second mode. At this point in the description, the control system 10 is in the first mode, so the method returns to step 84.

Returning to step 96, the processor determines if the speed of the vehicle is greater than a threshold speed. If the speed of the vehicle is greater than the threshold speed, the method proceeds to step 100. If the speed of the vehicle is not greater than the threshold speed, the method proceeds to step 98. In step 98, similar to step 90, the processor determines if the control system 10 is currently in the second mode. At this point in the description, the control system 10 is in the first mode, so the method returns to step 84.

Returning to step 100, the processor determines whether each condition from steps 88, 92, and 96 is met for a respective length of time greater than a respective predetermined threshold length of time ("$T_{threshold}$"). Each condition may have the same $T_{threshold}$. For example, the $T_{threshold}$ for each condition may be three seconds. Alternatively, each condition may have a different respective $T_{threshold}$. For example, the $T_{threshold}$ for the transmission state (step 88) may be two seconds, the cylinder pressure (step 92) three seconds, and the vehicle speed (step 96) four seconds. In step 100, if each condition from steps 88, 92, and 96 is met for its respective $T_{threshold}$, the method proceeds to step 102, in which the control system 10 switches to the second mode. As described above, switching to the second mode may include opening the valve to connect the auxiliary compressible gas volumes 20, 22 to the main compressible gas volume 16 to increase the total compressible gas volume fluidly connected with the suspension cylinders 12, 26. In step, 100, if each condition from steps 88, 92, and 96 is not met for a respective $T_{threshold}$, the method returns to step 84 without switching to the second mode. Thus, in this embodiment, the processor switches from the first mode to the second mode only if each of the above conditions is remains unmet for a respective $T_{threshold}$. This switching delay may prevent undesirable rapid switching between the first mode and the second mode which otherwise could be caused by one or more operating parameters oscillating above and below a respective threshold. Alternatively, in other embodiments, the processor may switch immediately when one of the above operating parameters fails to meet a respective threshold requirement.

Referring again to the embodiment illustrated in FIG. 4, once the control system 10 is in the second mode, the processor continues to monitor the operating parameters. The processor may automatically switch the control system 10 from the second mode back to the first mode based on the operating parameters. The processor may switch immediately in response to certain operating parameters failing to meet a respective threshold requirement. For example, these criteria may include the engine turning off (step 84) or the park brake being applied (step 86). Applying the parking brake often indicates that the vehicle will soon be loaded with materials. Thus, when the parking brake is applied, the control system 10 switches to the first mode in anticipation of a possible increase of load on the suspension cylinder 12, 26.

The portion of the flowchart illustrating the above-described operation of the control system 10 when in the second mode will now be explained. In step 84, if the engine stops running, the method proceeds to step 82 and switches to the first mode. In step 86, if the park brake is applied, the method proceeds to step 82 and switches to the first mode.

For certain other operating parameters, the processor may not immediately switch in response to such operating parameters failing to meet a respective threshold requirement. Rather, for these operating parameters, the processor may automatically switch from the second mode to the first mode only when they fail to meet a respective threshold requirement for a respective $T_{threshold}$. For example, the processor may switch from the second mode to the first mode when any one of the transmission status (step 104), cylinder pressure (step 106), and vehicle speed (step 108) fail to meet a respective threshold for a respective $T_{threshold}$.

The portion of the flowchart illustrating the above-described operation of the control system 10 when in the second mode will now be explained. If the processor detects that the transmission is not in the forward state (step 88), while the control system 10 is in the second mode (step 90), the method proceeds to step 104. In step 104, the processor determines if the transmission status determined in step 88 is maintained for a respective $T_{threshold}$. If it is, the method proceeds to step 82, in which the control system 10 switches from the second mode to the first mode. For example, the $T_{threshold}$ for the transmission status may be three seconds. In this example, if the transmission remains in a state other than forward, such as reverse, for three continuous seconds, then the method proceeds to step 82. If the transmission status is not maintained for the respective $T_{threshold}$, however, then the method proceeds to step 84, and the control system 10 is not switched to the first mode. For example, if while the control system 10 is in the second mode, the transmission is put in reverse for one second only (and the respective $T_{threshold}$ for the transmission is three seconds as in the previous example), then from step 104 the method proceeds to step 84, and the processor does not switch from the second mode to the first mode at this point.

The process is similar for steps 92, 94, and 106. If the processor detects that pressure in the suspension cylinders 12, 26 is not below the threshold pressure (step 92) while the control system 10 is in the second mode (step 94), then the method proceeds to step 106. In step 106, if the cylinder pressure status detected in step 92 is maintained for a respective $T_{threshold}$, then the method proceeds to step 82, in which the control system 10 switches from the second mode to the first mode. For example, the cylinder threshold pressure may be 11 MPa and the $T_{threshold}$ may be three seconds. In this example, if the pressure in the suspension cylinders 12, 26 remains equal to or greater than 11 MPa for three seconds or longer, the method proceeds to step 82, and the control system 10 switches to the first mode. As discussed above, the pressure in the suspension cylinders 12, 26 may be indicative of the total weight of the vehicle. If the pressure in the suspension cylinders 12, 26 remains above the threshold pressure for the $T_{threshold}$, it may indicate that the vehicle is in the process of being loaded. In response, the control system 10 switches to the first mode to better accommodate the increased load and prevent bottoming out of the suspension cylinders 12, 26. In step 106, if the pressure in the suspension cylinders 12, 26 does not remain greater than the threshold pressure for the respective $T_{threshold}$, then the method proceeds to step 84 and does not switch to the first mode at that point.

Similarly, if the processor detects that the speed of the vehicle is not above the threshold speed (step 96) and the vehicle is in the second mode (step 98), then the method proceeds to step 108. In step 108, similar to steps 104 and 106, if the speed status detected in step 96 is maintained for a respective $T_{threshold}$, then the method proceeds to step 82, in which the control system 10 is switched from the second mode to the first mode. For example, the speed threshold may be three kilometers per hour, and the $T_{threshold}$ may be three seconds. In this example, if the speed remains less than or equal to three kilometers per hour for a continuous three seconds, then the method proceeds to step 82, and switches to the first mode. A low vehicle speed may indicate that the vehicle is slowing down to be loaded with materials. In anticipation of a potential rapid increased in load, the control system 10 switches to the first mode. This prevents bottoming out of the suspension cylinders 12, 26 from rapid loading while in the second mode. In step 108, if the processor determines that the speed of the vehicle does not remain less than or equal to the threshold speed for the respective $T_{threshold}$, then the method proceeds to step 84 and does not switch to the first mode at that point.

Alternatively, in another embodiment, the processor may immediately switch from the second mode to the first mode when one or more of the above criteria are not met. Alternatively, in another embodiment, the method may use two different thresholds: one threshold for switching from the first mode to the second mode, and a second threshold for switching from the second mode to the first mode. For example, the processor may switch from the first mode to the second mode based on the vehicle's speed exceeding 5 kilometers per hour. In this example, the processor may switch from the second mode back to the first mode based on the vehicle's speed slowing below 2 kilometers per hour (instead of only below 5 kilometers per hour). Different thresholds, as described above, may be used instead of requiring the status of the operating parameter to be maintained for a respective $T_{threshold}$. Alternatively, different thresholds, as described above, may be used in combination with requiring the status of the operating parameter to be maintained for a respective $T_{threshold}$.

Although not illustrated in FIG. 4, the override switch may be used to manually override the operation of the control system 10, explained above. For example, the override switch may be used to switch the control system 10 into the second mode when the engine is not running, despite step 84. As noted above, when the processor is initially turned on (step 80), the control system 10 is in the first mode (step 82) under normal operation. Additionally, the override switch may be used to switch between modes at any time during operation of the control system 10. This feature may be used, for example, to facilitate servicing of the control system 10.

The disclosed method and system may provide several benefits. For example, the system does not require a separate pump to change the system's operating characteristics, such as stiffness. This may reduce the system's energy consumption, cost, and complexity. This may also provide for rapid switching between the first and second mode without undesirable delay associated with waiting for a separate pump to increase the system's operating pressure, for example. The automatic switching of the disclosed method may provide additional benefits. For example, the disclosed method does not require the operator to divert his attention from the task of driving the vehicle to manually switch between modes. Additionally, the disclosed method does not rely on the operator to remember to switch between modes. For example, with a manual control system, if the operator forgot to switch from the second mode back to the first mode prior to loading of the vehicle, the vehicle could be damaged from bottoming out.

It will be apparent to those skilled in the art that various modifications and variations can be made to the disclosed control system without departing from the scope of the disclosure. Other embodiments of the control system will be apparent to those skilled in the art from consideration of the specification and practice of the suspensions system disclosed herein. It is intended that the specification and examples be considered as illustrative only, with a true scope being indicated by the following claims and their equivalents.

What is claimed is:

1. A suspension control system for controlling a response of a suspension cylinder configured to support a main body of a vehicle in relation to a ground-contacting portion of the vehicle, the suspension control system comprising:
   a main accumulator configured to contain a main compressible gas volume, the main accumulator fluidly connected with the suspension cylinder such that compressing the suspension cylinder compresses the main compressible gas volume;
   an auxiliary accumulator configured to contain an auxiliary compressible gas volume;
   a valve configured to selectively fluidly connect the auxiliary accumulator to the suspension cylinder, wherein:
      when the valve is in an open position, compressing the suspension cylinder compresses both the main compressible gas volume and the auxiliary compressible gas volume; and
      when the valve is in a closed position, the auxiliary accumulator is fluidly isolated from the suspension cylinder;
   a solenoid actuator configured to open and close the valve; and
   a processor configured to monitor one or more operating parameters of the vehicle and automatically open or close the valve using the solenoid actuator based on the one or more operating parameters of the vehicle.

2. The suspension control system of claim 1, further comprising a pressure sensor configured to measure a pressure in the suspension cylinder, wherein:
   the operating parameters include the pressure; and
   the processor is configured to automatically open the valve based on the pressure being below a threshold pressure.

3. The suspension control system of claim 2, wherein the processor is further configured to compare one or more operating parameters with respective threshold requirements and determine whether at least one operating parameter meets a respective threshold requirement for a length of time greater than a predetermined threshold length of time.

4. The suspension control system of claim 1, wherein the solenoid actuator uses a pilot oil supply of an engine of the vehicle to open the valve.

5. The suspension control system of claim 1, wherein the valve is a ball valve.

6. The suspension control system of claim 1, wherein a restrictor dampens fluid flow between the main accumulator and the suspension cylinder.

7. A method for controlling a response of a suspension cylinder of a vehicle, the method comprising:
monitoring one or more operating parameters of the vehicle; and
automatically switching between a first mode and a second mode based on one or more operating parameters of the vehicle, wherein:
a first mode includes a first spring stiffness and a first damping rate; and
a second mode includes at least one of a second spring stiffness lower than the first spring stiffness and a second damping rate lower than the first damping rate.

8. The method of claim 7, wherein automatically switching includes opening a valve to connect an auxiliary compressible gas volume to a main compressible gas volume to increase a total compressible gas volume fluidly connected with the suspension cylinder.

9. The method of claim 7, wherein automatically switching from the first mode to the second mode occurs when more than one operating parameter meets a respective threshold requirement for a length of time greater than a respective predetermined threshold length of time.

10. The method of claim 7, wherein:
the operating parameters include a pressure in the suspension cylinder; and
automatically switching from the first mode to the second mode occurs based on the pressure in the suspension cylinder being less than a threshold pressure.

11. The method of claim 10, wherein automatically switching from the first mode to the second mode occurs when the pressure in the suspension cylinder remains less than the threshold pressure for a length of time greater than a predetermined threshold length of time.

12. The method of claim 7, wherein automatically switching from the second mode to the first mode occurs when a pressure in the suspension cylinder remains greater than a threshold pressure for a length of time greater than a predetermined threshold length of time.

13. The method of claim 7, wherein:
the operating parameters include a ground speed; and
automatically switching from the first mode to the second mode occurs based on the ground speed being greater than a threshold speed.

14. The method of claim 13, wherein automatically switching from the first mode to the second mode occurs when the ground speed remains greater than the threshold speed for a length of time greater than a predetermined threshold length of time.

15. The method of claim 7, wherein:
the operating parameters include a transmission state; and
automatically switching from the first mode to the second mode occurs based on a transmission of the vehicle being in a forward state.

16. The method of claim 15, wherein automatically switching from the first mode to the second mode occurs when the vehicle remains in the forward state for a length of time greater than a predetermined threshold length of time.

17. The method of claim 7, wherein:
the operating parameters include an engine status; and
automatically switching from the first mode to the second mode occurs based on an engine of the vehicle running.

18. The method of claim 7, wherein automatically switching from the second mode to the first mode occurs when one or more operating parameters fail to meet a respective threshold requirement for a respective length of time greater than a respective predetermined threshold length of time.

19. The method of claim 7, wherein:
the operating parameters include a park brake status; and
automatically switching from the second mode to the first mode occurs when a parking brake of the vehicle is engaged.

20. A control system for a suspension cylinder, the control system comprising:
a main accumulator tank configured to contain a main compressible gas volume, the main accumulator tank fluidly connected with the suspension cylinder such that compressing the suspension cylinder compresses the main compressible gas volume;
an auxiliary accumulator tank configured to contain an auxiliary compressible gas volume;
a valve configured to selectively fluidly connect the auxiliary accumulator tank to the suspension cylinder such that, when the valve is in an open position, compressing the suspension cylinder compresses both the main compressible gas volume and the auxiliary compressible gas volume, and when the valve is in a closed position, the valve fluidly disconnects the auxiliary compressible gas volume from the suspension cylinder;
an actuator configured to open and close the valve; and
a processor configured to monitor one or more operating parameters of the vehicle and automatically open or close the valve using the actuator based on the one or more operating parameters of the vehicle.

* * * * *